(12) United States Patent
Hitotsumatsu et al.

(10) Patent No.: US 7,818,171 B2
(45) Date of Patent: Oct. 19, 2010

(54) SPEECH RECOGNITION APPARATUS AND SPEECH RECOGNITION PROGRAM

(75) Inventors: Takafumi Hitotsumatsu, Kariya (JP); Masayuki Takami, Hamamatsu (JP)

(73) Assignee: DENSO CORPORATION, Kariya (JP)

( * ) Notice: Subject to any disclaimer, the term of this patent is extended or adjusted under 35 U.S.C. 154(b) by 888 days.

(21) Appl. No.: 11/717,027

(22) Filed: Mar. 13, 2007

(65) Prior Publication Data
US 2007/0233485 A1    Oct. 4, 2007

(30) Foreign Application Priority Data
Mar. 31, 2006   (JP)  ................. 2006-096853

(51) Int. Cl.
- G10L 15/04 (2006.01)
- G10L 19/14 (2006.01)
- G10L 15/20 (2006.01)

(52) U.S. Cl. ............... 704/252; 704/211; 704/233; 704/253

(58) Field of Classification Search ............... None
See application file for complete search history.

(56) References Cited

U.S. PATENT DOCUMENTS

| | | | |
|---|---|---|---|
| 5,621,859 A * | 4/1997 | Schwartz et al. | 704/256 |
| 5,884,259 A * | 3/1999 | Bahl et al. | 704/252 |
| 6,064,959 A * | 5/2000 | Young et al. | 704/251 |
| 6,236,962 B1 | 5/2001 | Kosaka et al. | |
| 6,411,893 B2 * | 6/2002 | Ruhl | 701/207 |
| 6,598,016 B1 * | 7/2003 | Zavoli et al. | 704/251 |
| 7,240,008 B2 * | 7/2007 | Hitotsumatsu | 704/275 |
| 2001/0041978 A1 | 11/2001 | Crespo et al. | |
| 2003/0065516 A1 | 4/2003 | Hitotsumatsu | |
| 2004/0267529 A1 * | 12/2004 | Baker | 704/252 |
| 2007/0100618 A1 * | 5/2007 | Lee et al. | 704/238 |

FOREIGN PATENT DOCUMENTS

| | | |
|---|---|---|
| JP | A-H10-097275 | 4/1998 |
| JP | A-11-231894 | 8/1999 |
| JP | A-2001-154691 | 6/2001 |
| JP | A-2005-134436 | 5/2005 |

OTHER PUBLICATIONS

S. Austin, et al., "The Forward-Backward Search Algorithm," *International Conference on Acoustics, Speech, and Signal Processing* (ICASSP-91), 1991, ICASSP, pp. 697-700.

Office Action dated Apr. 26, 2010 from the German Patent and Trademark Office in the corresponding patent application No. 10 2007 015 497.8-56 (English translation enclosed).

* cited by examiner

*Primary Examiner*—Brian L Albertalli
(74) *Attorney, Agent, or Firm*—Posz Law Group, PLC

(57) ABSTRACT

A speech recognition apparatus includes a storage medium for storing tree structured dictionary data containing words as nodes in a tree structure with a root and leaf nodes. An input speech is compared with a forward acoustic model corresponding to a speech resulting from chronologically reproducing words indicated by nodes for leaf nodes. A backward speech is further compared with a backward acoustic model. The backward speech is generated by reproducing the input speech in chronologically backward order. The backward acoustic model corresponds to a speech resulting from reproducing a word string toward the root in chronologically backward order. The comparison is performed in the backward order of a sequence starting from one of separator nodes. The speech recognition apparatus thereby outputs a word string that highly likely matches the input speech.

21 Claims, 7 Drawing Sheets

SPEECH RECOGNITION APPARATUS AND SPEECH RECOGNITION PROGRAM

CROSS REFERENCE TO RELATED APPLICATION

This application is based on and incorporates herein by reference Japanese Patent Application No. 2006-96853 filed on Mar. 31, 2006.

FIELD OF THE INVENTION

The present invention relates to a speech recognition apparatus and a speech recognition program.

BACKGROUND OF THE INVENTION

Conventionally, there is proposed a speech recognition apparatus that uses tree structured dictionary data for speech recognition (e.g., see patent document 1). The tree structured dictionary data contains each of multiple words as a node in the tree structure. The speech recognition apparatus determines to what degree an input speech matches a string of words (hereafter referred to as a word string) along a path from a root of the tree structure to a leaf node. To perform the determination, the speech recognition apparatus sequentially compares the input speech with an acoustic model corresponding to the word string in accordance with a sequence of the word string.

In addition, there is proposed a speech recognition apparatus that recognizes an input speech in the order reverse to another order used to input the speech. The speech recognition apparatus performs the reverse recognition using backward tree structured dictionary data in which words are arranged in the order of utterance from a leaf node to the root according to the tree structure.

For example, the speech recognition apparatus described in patent document 2 can recognize an unpunctuated input speech representing a street address uttered in the order of street, city, and state according to the system in Europe or the United States. The speech recognition apparatus sorts a waveform or a feature quantity of the input speech in reverse order of the utterance. The speech recognition apparatus determines to what degree the sorted backward speech matches a word string arranged from the root to a leaf node in the backward tree structure. To do this, the speech recognition apparatus sequentially compares an acoustic model corresponding to the word string with the backward speech in accordance with a sequence of the word string.

Patent Document 1: JP-11-231894 A

Patent Document 2: JP-2003-114696 A

However, the above-mentioned speech recognition apparatus technology uses the backward tree structured dictionary data and cannot complete the recognition until a user utters the whole of a word string arranged from the leaf node to the root of the tree structure.

SUMMARY OF THE INVENTION

The present invention has been made in consideration of the foregoing. It is therefore an object of the invention to provide a speech recognition apparatus capable of using backward tree structured dictionary data and highly accurately recognizing a speech that is uttered up to the middle of a word string arranged from a leaf node to a root of the tree structure.

According to an aspect of the present invention, a speech recognition apparatus is provided as follows. A storage medium is configured to store tree structured dictionary data that contains a plurality of words as nodes in a tree structure. A backward speech comparison unit is configured to compare a backward speech resulting from reproducing an input speech in chronologically backward order with a backward acoustic model corresponding to a speech of reversely reproducing a word string sequence toward a root of the tree structure, wherein a comparison is performed in reverse order of the sequence. A forward speech comparison unit is configured to compare the input speech with a forward acoustic model corresponding to a speech resulting from reproducing a leaf node word of the tree structure in chronologically forward order. An output unit is configured to output a word or a word string highly likely matching the input speech based on a comparison result each from the backward speech comparison unit and the forward speech comparison unit.

In the above structure, the forward acoustic model to be compared with the input speech corresponds to a speech resulting from reproducing a leaf node word of the tree structure in chronologically forward order. Therefore, the forward acoustic model can most likely match the utterance of the leaf node word in the tree structure.

Thus, the speech recognition apparatus, which uses the backward tree structured dictionary data, can recognize a speech even when it is uttered up to the middle of a word string ranging from a leaf node to the root in the tree structure.

The "backward speech resulting from reproducing an input speech in chronologically backward order" may be reverse waveforms, which result from arranging or reproducing, in chronologically (i.e., time-series) reverse order, the waveforms of the input speech, which are indicated on time-intensity axes. Alternatively, it may be reverse feature quantities, which result from re-arranging, in chronologically backward order, the feature quantities of the input speech, which are relative to each of unit time intervals. That is, the backward speech resulting from reproducing an input speech in chronologically backward order may result from rearranging the characteristics of the input speech in chronologically backward order.

The "word" recited in the above aspect may be a unit as a constituent element of a speech such as a phoneme, syllable, single word, phrase, or vocable. Further, the "node" in the tree structure may not be limited to indicate a word. Part of nodes included in the tree structure may indicate a separator between words.

According to another aspect of the present invention, a speech recognition apparatus is provided as follows. A storage medium is configured to store tree structured dictionary data that contains a plurality of words as nodes in a tree structure. A backward speech comparison unit is configured to compare a backward speech resulting from reproducing an input speech in chronologically backward order with a backward acoustic model corresponding to a speech of reproducing, in chronologically backward order, a word string sequence toward a root of the tree structure, wherein a comparison is performed in reverse order of the sequence. A forward speech comparison unit is configured to compare the input speech with a forward acoustic model corresponding to a speech resulting from chronologically reproducing a sequence of a word string (hereafter referred to as an intermediate word string) that starts from a leaf node word toward a root and ends with a node other than the root of the tree structure, wherein a comparison is performed in order of the sequence. An output unit is configured to output a word string highly likely matching the input speech based on a comparison result each from the backward speech comparison unit and the forward speech comparison unit.

In the above aspect, the forward acoustic model to be compared with the input speech corresponds to a speech resulting from chronologically reproducing an intermediate word string as a sequence of a word string that starts from a leaf node word toward a root and ends with a node other than the root of the tree structure. Therefore, the forward acoustic model can most likely match the utterance of the intermediate word as a speech that is uttered up to the middle of a word string arranged from a leaf node to a root of the tree structure. Thus, the speech recognition apparatus, which uses the backward tree structured dictionary data, can recognize a speech even when the speech is uttered only up to the middle of a word string ranging from a leaf node to the root in the tree structure.

According to another aspect of the present invention, a speech recognition apparatus is provided as follows. A storage medium is configured to store tree structured dictionary data and separator specification data, wherein the tree structured dictionary data contains a plurality of words as nodes in a tree structure and the separator specification data specifies a plurality of nodes equivalent to separators for words of the tree structured dictionary data other than a root in the tree structure. A backward speech comparison unit is configured to compare a backward speech resulting from reproducing an input speech in chronologically backward order with a backward acoustic model corresponding to a speech of reproducing, in chronologically backward order, a sequence of words or word string that is arranged toward a root of the tree structure and ends with one of the plurality of nodes specified by the separator specification data, wherein a comparison is performed in reverse order of the sequence. An output unit is configured to output a word or a word string highly likely matching the input speech based on a comparison result from the backward speech comparison unit.

In the above aspect, the speech recognition apparatus compares a backward speech resulting from reproducing an input speech in chronologically backward order with a backward acoustic model corresponding to a speech ending with a specified node. Thus, the speech recognition apparatus, which uses the backward tree structured dictionary data, can recognize a speech even when the speech is uttered only up to the middle of a word string ranging from a leaf node to the root in the tree structure.

The node corresponding to a separator for words may be a separator between words, or a phoneme of terminating or starting of a word. Further, it may be a node signifying a single word itself. The separator specification data may be allowed to specify any node other than a root in the tree structure. In this case, the speech recognition apparatus may compare a backward speech resulting from reproducing an input speech in chronologically backward order with a backward acoustic model corresponding to a speech ending with the root of the backward tree structure.

According to another aspect of the present invention, a computer program product in a computer-readable medium for use in recognizing a speech is provided with the following: instructions for performing backward speech comparison to compare a backward speech resulting from reproducing an input speech in chronologically backward order with a backward acoustic model corresponding to a speech of reversely reproducing a word string sequence toward a root of a tree structure for tree structured dictionary data containing a plurality of words as nodes in the tree structure, wherein the comparison is made in reverse order of the sequence; instructions for performing forward speech comparison to compare the input speech with a forward acoustic model corresponding to a speech resulting from reproducing a leaf node word of the tree structure in chronologically forward order; and instructions for outputting a word or a word string highly likely matching the input speech based on a comparison result each from the backward speech comparison and the forward speech comparison.

According to another aspect of the present invention, a computer program product in a computer-readable medium for use in recognizing a speech is provided with the following: instructions for performing backward speech comparison to compare a backward speech resulting from reproducing an input speech in chronologically backward order with a backward acoustic model corresponding to a speech of reproducing, in chronologically backward order, a word string sequence toward a root of a tree structure for tree structured dictionary data containing a plurality of words as nodes in the tree structure, wherein the comparison is performed in reverse order of the sequence; instructions for performing forward speech to compare the input speech with a forward acoustic model corresponding to a speech resulting from chronologically reproducing an intermediate word string, which is a sequence of a word string starting from a leaf node word toward a root and ending with a node other than the root of the tree structure, wherein the comparison is performed in order of the sequence; and instructions for outputting a word string highly likely matching the input speech based on a comparison result each from the backward speech comparison and the forward speech comparison.

According to another aspect of the present invention, a computer program product in a computer-readable medium for use in recognizing a speech is provided with the following: instructions for reading tree structured dictionary data and separator specification data from a storage medium for storing the data, wherein the tree structured dictionary data contains a plurality of words as nodes in a tree structure and the separator specification data specifies a plurality of nodes equivalent to separators for words of the tree structured dictionary data other than a root in the tree structure; instructions for performing backward speech comparison to compare a backward speech resulting from reproducing an input speech in chronologically backward order with a backward acoustic model corresponding to a speech of reproducing, in chronologically backward order, a sequence of words or word string that is arranged toward a root of the tree structure and ends with one of the plurality of nodes specified by the separator specification data, wherein the comparison is performed in reverse order of the sequence; and instructions for outputting a word or a word string highly likely matching the input speech based on a comparison result from the backward speech comparison.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
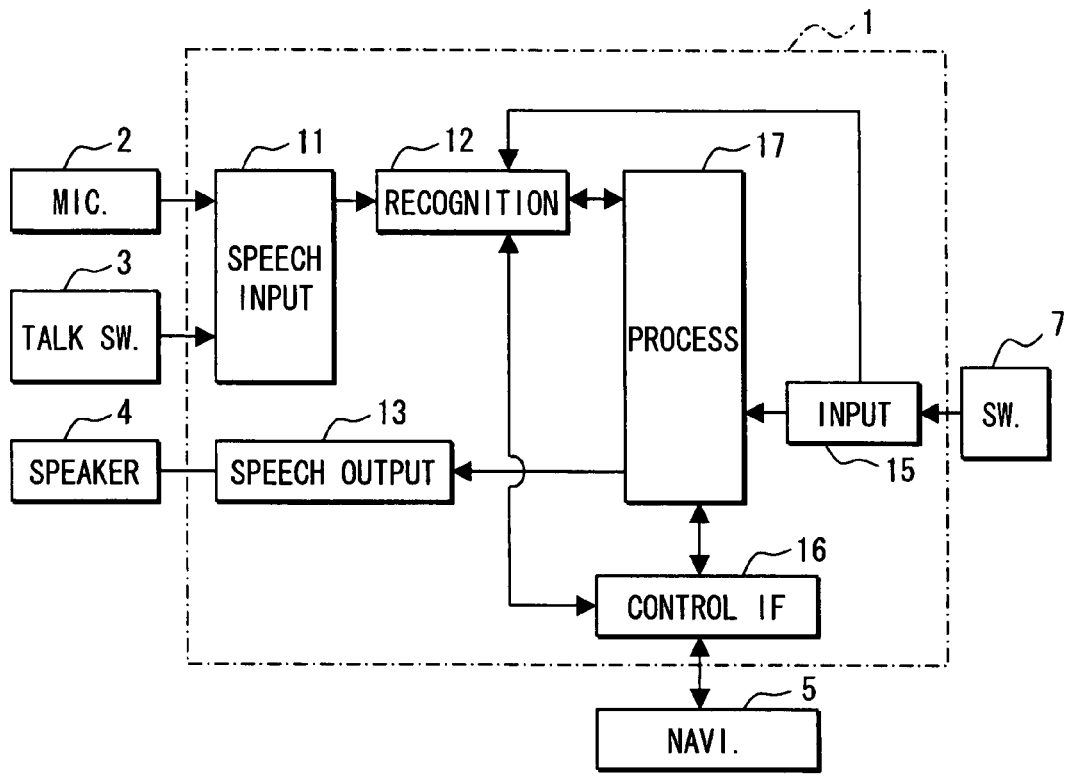
FIG. 1 is a block diagram showing the construction of a speech recognition apparatus.

The following describes a first embodiment as an example of the invention. FIG. 1 shows the overall construction of an in-vehicle speech recognition apparatus according to the embodiment. As shown in FIG. 1, the speech recognition apparatus includes a control apparatus 1, a microphone 2, a talk switch 3 as a push button, a speaker 4, a navigation apparatus 5, and a switch apparatus 7. When a user utters, e.g., a street address while pressing the talk switch 3, the microphone 2 outputs a signal for the speech to the control apparatus 1. The control apparatus 1 recognizes the speech to specify a character string represented by the speech. The control apparatus 1 outputs a signal indicative of the character string to the navigation apparatus 5. The control apparatus 1 also outputs a speech signal to the speaker 4 when needed. The control apparatus 1 further performs a process corresponding to a user operation on the switch apparatus 7 or corresponding to a signal received from the navigation apparatus 5 when needed.

The in-vehicle navigation apparatus 5 displays a current vehicle position and a route to the destination by superposing them on a map. The navigation apparatus 5 specifies the current vehicle position (e.g., latitude and longitude) based on map data and signals from a geomagnetic sensor, a gyroscope, a vehicle speed sensor, and a GPS (Global Positioning System) receiver that are widely known but are not diagramed. Based on the specified current position and the map data, the navigation apparatus 5 determines an address name (e.g., a set of state, city, and street) to which the current vehicle position belongs. The navigation apparatus 5 always outputs information about the specified address name such as character string data to the control apparatus 1. Further, the navigation apparatus 5 receives phrase data from the control apparatus 1 and performs a function corresponding to the phrase indicated by the received data. When the received data indicates an address name, for example, the navigation apparatus 5 specifies the position corresponding to the address name as a destination.

The control apparatus 1 includes a speech input unit 11, a speech recognition unit 12, a speech output unit 13, an input unit 15, a device control interface 16, and a process unit 17. The speech input unit 11 analyzes a speech signal received from the microphone 2 while the talk switch 3 is pressed. In this manner, the speech input unit 11 calculates a feature quantity of the speech and outputs the calculated feature quantity to the speech recognition unit 12. The speech recognition unit 12 collates the feature quantity received from the speech input unit 11 with multiple speech patterns. The speech recognition unit 12 outputs a collation result to the process unit 17. The process unit 17 specifies one phrase based on the collation result and outputs a signal representing the character string of the phrase to the navigation apparatus 5 via the device control interface 16.

The input unit 15 receives a signal from the switch apparatus 7 and outputs the signal to the process unit 17 and the speech recognition unit 12. The speech recognition unit 12 interchanges signals with the navigation apparatus 5 via the device control interface 16 when needed. The speech output unit 13 generates a speech signal based on control provided by the process unit 17 according to need and outputs the generated speech signal to the speaker 4.

Figure 2:
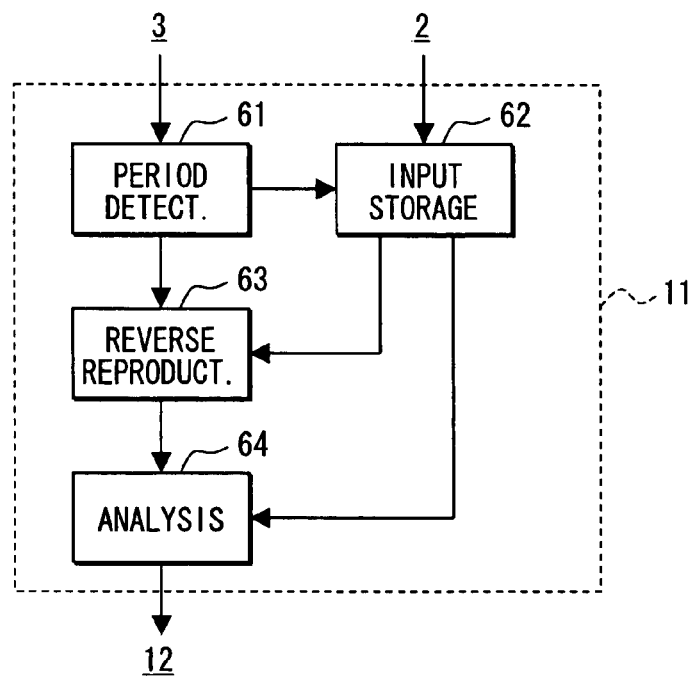
FIG. 2 is a block diagram showing the construction of a speech input unit.

FIG. 2 shows the internal construction of the speech input unit 11. As shown in FIG. 2, the speech input unit 11 includes a speech period detection unit 61, an input speech storage unit 62, a reverse reproduction unit 63, and a speech analysis unit 64. Each of the units 61 through 64 is composed of a microcomputer including a set of a CPU, ROM, RAM, and the like. The CPU reads a program for implementing functions (to be described) from the corresponding ROM and executes the program. When executing the program, the CPU reads or writes data to the corresponding RAM.

The speech period detection unit 61 detects the beginning of user's utterance period based on a user's press of the talk switch 3. The speech period detection unit 61 detects the end of user's utterance period based on a user's release of the talk switch 3. Immediately after detecting the beginning of utterance period, the speech period detection unit 61 accordingly outputs a signal to the input speech storage unit 62. Immediately after detecting the end of utterance period, the speech period detection unit 61 accordingly outputs a signal to the input speech storage unit 62 and the reverse reproduction unit 63.

The input speech storage unit 62 receives a speech signal from the microphone 2 during the utterance period and stores the signal as waveform data whose intensity chronologically varies with a sampling interval (e.g., in approximately 0.1 milliseconds). The utterance period ranges between the reception of a signal indicating the beginning of the utterance period from the speech period detection unit 61 and the reception of a signal indicating the end thereof from the same. The input speech storage unit 62 realtime outputs waveform data to the speech analysis unit 64 based on a speech signal that is received from the microphone 2 during the utterance period. The realtime output signifies detecting the speech signal intensity upon lapse of the sampling interval and simultaneously outputting data corresponding to the detected intensity. The input speech storage unit 62 receives the signal indicating the end of the utterance period from the speech period detection unit 61, and then outputs the waveform data stored during the utterance period to the reverse reproduction unit 63 at a time.

The reverse reproduction unit 63 receives the signal indicating the end of the utterance period from the speech period detection unit 61. In this case, the reverse reproduction unit 63 reproduces the waveform data output from the input speech storage unit 62 in chronologically backward order (i.e., chronologically reverse order or an order reverse to an order in which a speech is uttered or spoken) and outputs the waveform data to the speech analysis unit 64. The reproduction in chronologically backward order signifies sorting the intensity data contained in the waveform data at each sampling interval in chronologically backward order and outputting the sorted data to the speech analysis unit 64.

The speech analysis unit 64 receives waveform data from the input speech storage unit 62 or the speech analysis unit 64. Upon reception, the speech analysis unit 64 immediately determines feature quantity (e.g., LPC cepstrum) of the received waveform data at an interval of the data's unit segment (e.g., approximately 10 milliseconds) during this period. The speech analysis unit 64 immediately outputs the feature quantity to the speech recognition unit 12.

According to the above-mentioned construction, the speech input unit 11 specifies a duration of continuously pressing the talk switch 3 to be an utterance period. During the specified utterance period, the speech input unit 11 realtime outputs the feature quantity of the speech uttered by the user to the speech recognition unit 12 in chronological order. The feature quantity of the user's speech is stored during the utterance period. After the end of the utterance period, the speech input unit 11 outputs the stored feature quantity to the speech recognition unit 12 in chronologically backward order. The feature quantity output in reverse reproduction order is an example of the backward speech.

Figure 3:
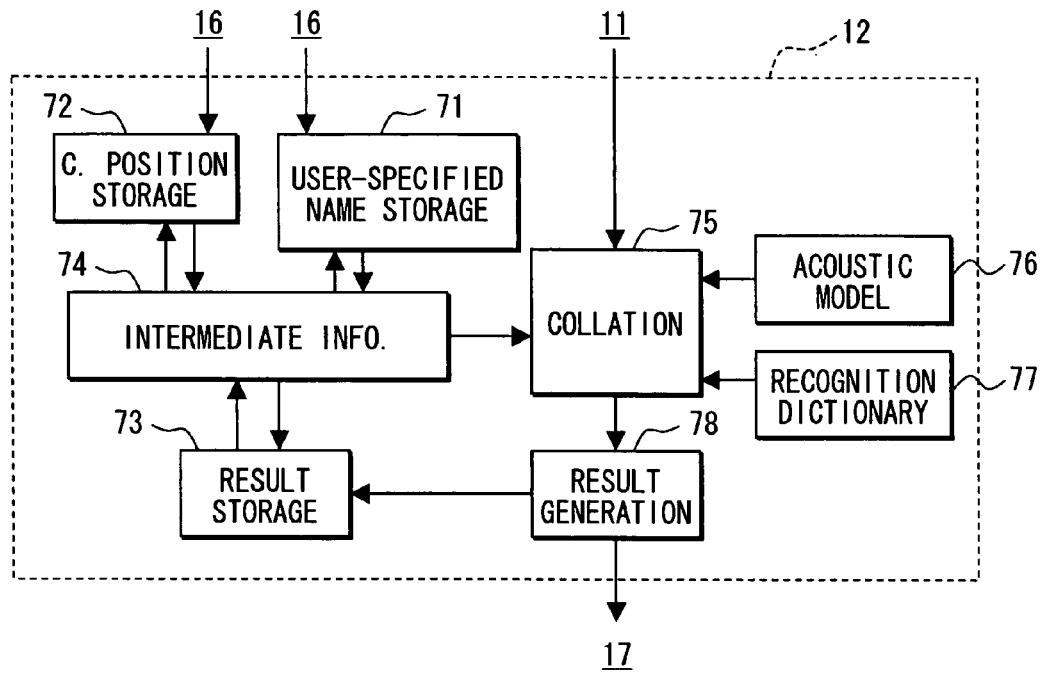
FIG. 3 is a block diagram showing the construction of a speech recognition unit.

FIG. 3 shows the construction of the speech recognition unit 12. As shown in FIG. 3, the speech recognition unit 12 includes a user-specified name storage unit 71, a current position storage unit 72, a result storage unit 73, an intermediate information unit 74, a collation unit 75, an acoustic model unit 76, a recognition dictionary unit 77, and a result generation unit 78. Each of the units 71 through 78 is composed of a microcomputer including a set of a CPU, ROM, RAM, and the like. The CPU reads a program for implementing functions (to be described) from the corresponding ROM and executes the program. When executing the program, the CPU reads or writes data to the corresponding RAM.

The user-specified name storage unit 71 receives character data for a user-specified address name from the navigation apparatus 5 via the device control interface 16 and stores that data. The user-specified name storage unit 71 outputs the stored data to the intermediate information unit 74 when needed.

The current position storage unit 72 receives character data for an address name from the navigation apparatus 5 via the device control interface 16 and stores that data. The current position storage unit 72 outputs the stored data to the intermediate information unit 74 when needed.

The result generation unit 78 generates recognition result data. The result storage unit 73 receives and stores this data. The result storage unit 73 outputs the stored data to the intermediate information unit 74 when needed.

The intermediate information unit 74 specifies intermediate place name information used for refinement on the collation unit 75 as will be described. The intermediate information unit 74 outputs the specified intermediate place name information to the collation unit 75. The intermediate place name information is equivalent to data stored in one of the user-specified name storage unit 71, the current position storage unit 72, and the result storage unit 73. Which unit to select may be determined based on a users selection operation performed on the input unit 15. None of the units 71 through 73 may store data for the intermediate place name information. That is, this information cannot be specified. In this case, the intermediate information unit 74 outputs a signal indicating this situation to the collation unit 75.

The collation unit 75 is supplied with the intermediate place name information from the intermediate information unit 74 and dictionary data stored in the recognition dictionary unit 77. Based on that information and dictionary data, the collation unit 75 compares the feature quantity received from the speech input unit 11 with multiple acoustic models output from the acoustic model unit 76. The collation unit 75 outputs a comparison result to the result generation unit 78.

Based on the comparison result received from the collation unit 75, the result generation unit 78 locates text data for a word or a phrase that most likely matches the feature quantity received from the speech input unit 11. The result generation unit 78 outputs that text data to the result storage unit 73 and the process unit 17.

The following describes the collation unit 75, the acoustic model unit 76, the recognition dictionary unit 77, and the result generation unit 78 in more detail. The collation unit 75 acquires multiple acoustic models from the recognition dictionary unit 77. The collation unit 75 compares each acoustic model with the feature quantity (hereafter referred to as the input feature quantity) received from the speech input unit 11. As a comparison result, the collation unit 75 calculates a matching degree (e.g., likelihood) between each acoustic model and the input feature quantity. The collation unit 75 specifies an acoustic model to be acquired from the recognition dictionary unit 77 based on dictionary data and specification data stored in the recognition dictionary unit 77.

Figure 4:
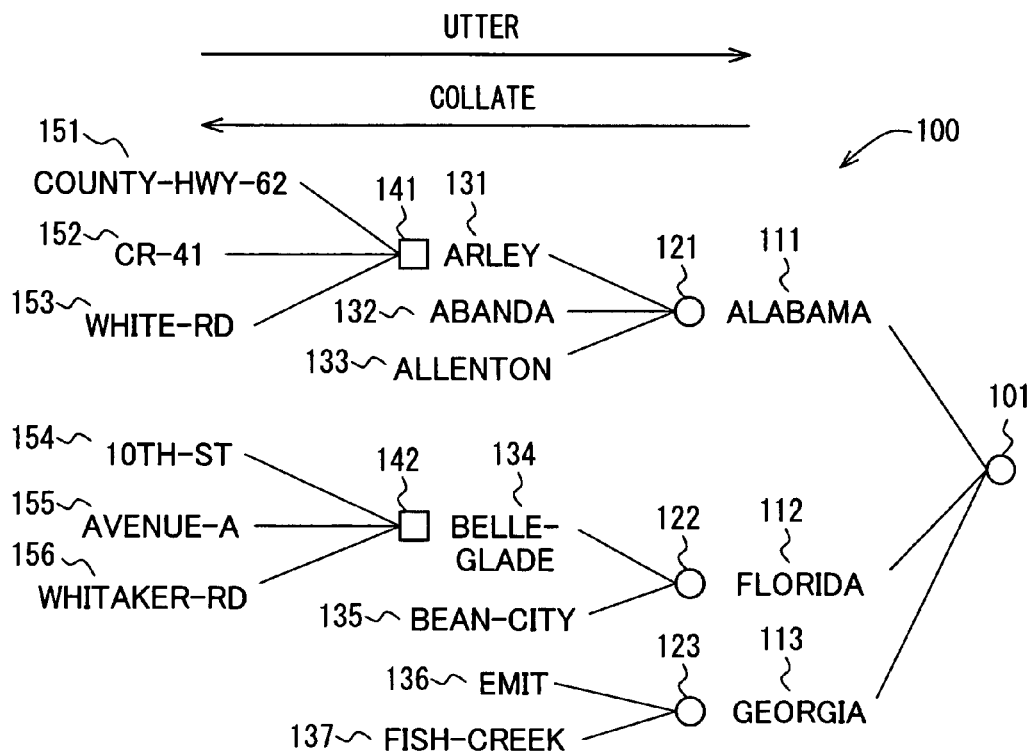
FIG. 4 shows the conceptual construction of backward tree structured dictionary data.

The recognition dictionary unit 77 stores backward tree structured dictionary data and forward tree structured dictionary data. FIG. 4 shows the conceptual structure of backward tree structured dictionary data 100.

The backward tree structured dictionary data 100 has a tree structure and is used for backward collation of backward speech, as will be described later. The tree structure includes multiple nodes that are associated with each other like branches of a tree. More specifically, the tree structure contains a root node (node 101 in FIG. 4 or nodes 201 and 202 in FIG. 6) followed by one or more child nodes. Each child node is followed by another child node (or a grandchild node viewed from the parent node). The hierarchical parent-child relationship is maintained up to a leaf node. In the following description, child nodes of one node, i.e., of the same parent node, are referred to as sibling nodes.

As shown in FIG. 4, nodes 111 through 156 except a root 101 of the backward tree structured dictionary data 100 indicate words according to the embodiment or separators between words. Nodes indicating words are referred to as word nodes and correspond to the nodes 111 through 113, 131 through 137, and 151 through 156. Nodes indicating separators are referred to as separator nodes and correspond to the nodes 121 through 123, 141, and 142.

The nodes 111 through 113 belong to a child hierarchy (hereafter referred to as a first hierarchy) of the root 101 and correspond to states as address names. The nodes 131 through 137 belong to a grandchild hierarchy (hereafter referred to as a third hierarchy) of the first hierarchy and correspond to cities, i.e., administrative areas narrower than states as address names. The nodes 151 through 156 belong to a grandchild hierarchy (hereafter referred to as a leaf hierarchy) of the third hierarchy and correspond to streets, i.e., administrative areas narrower than cities as address names. When a node indicates a given address name, each of the grandchild nodes indicates an address name belonging to that address name.

The backward tree structured dictionary data 100 records as many particular address names as paths connecting the nodes from the root 101 to the leaf hierarchy according to the dictionary data's tree structure.

A user utters a particular address name in the order of street, city, and state according to the system in Europe or the United States. When the backward tree structured dictionary data 100 is traced in the order of user's utterance, tracing nodes start with leaf hierarchy nodes and ends with the root 101 according to the tree structure. In this manner, the backward tree structured dictionary data 100 decreases the number of nodes in the order of speech input.

FIG. 4 shows a small number of nodes for simplicity. Actually, however, the backward tree structured dictionary data 100 contains several tens to thousands of child nodes under one separator node.

Figure 5:
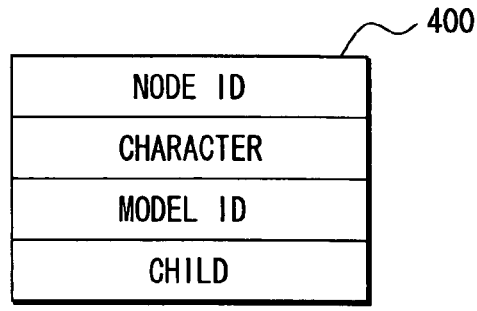
FIG. 5 shows the data structure of a data unit corresponding to a node in the tree structure.

In more detail, the backward tree structured dictionary data 100 includes a group of data units each of which maintains one-to-one correspondence with a node belonging to the tree structure. FIG. 5 shows a data construction of each data unit. A data unit 400 contains areas for a node ID, character data for a word, a model ID, and a child node ID list.

The node ID is data for uniquely identifying a node. The word text data represents a place name assigned to the corresponding node. The data unit for a separator node contains null data corresponding to the word text data. The model ID is data for uniquely identifying an acoustic model corresponding to the speech of a place name contained in the corresponding node. The unique acoustic model is identified from multiple acoustic models that can be output from the recognition dictionary unit 77. The data unit for a separator node contains null data as text data for the model ID. The child node ID list contains a group of node IDs for uniquely identifying each of all child nodes for the corresponding node.

This data unit structure makes it possible to specify the relationship between nodes in the backward tree structured dictionary data 100 and forward tree structured dictionary data 200 by sequentially tracing data units from the root to the child node.

Figure 6:
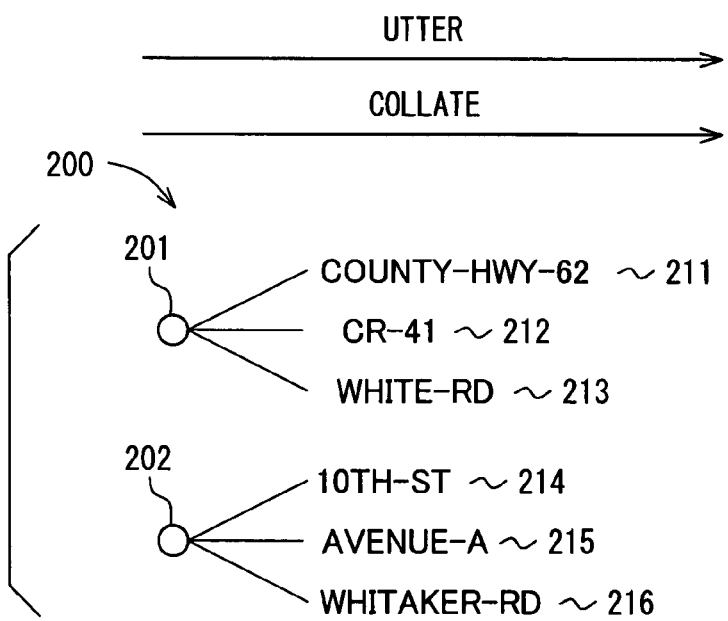
FIG. 6 shows the conceptual construction of forward tree structured dictionary data.

FIG. 6 shows the conceptual structure of the forward tree structured dictionary data 200. This data includes multiple tree structures. The forward tree structured dictionary data 200 is used to forward collate a forward speech, as will be described later.

As shown in FIG. 6, the forward tree structured dictionary data 200 contains such nodes as the multiple roots 201 and 202, and word nodes 211 through 216 as child nodes for the roots. The word nodes 211 through 216 represent streets as address names. The forward tree structured dictionary data 200 is constructed similarly to all the leaf hierarchy nodes (151 through 156 in FIG. 4) in the backward tree structured dictionary data 100 and all the parent nodes (141 and 142 in FIG. 4) of the leaf hierarchy nodes. In the forward tree structured dictionary data 200, child nodes for one root are equivalent to word nodes representing streets belonging to the same city.

The forward tree structured dictionary data 200 also contains data units constructed similarly to those in the backward tree structured dictionary data 100. Specifically, the forward tree structured dictionary data 200 is constructed similarly to all the data units corresponding to leaf hierarchy nodes and the data unit corresponding to the parent node in the backward tree structured dictionary data 100. A node ID in each data unit and in the child node ID list maintains the parent-child relationship between the corresponding data units in the backward tree structured dictionary data 100. However, the node ID value differs from that of the corresponding node in the backward tree structured dictionary data 100. A model ID in the data unit for the forward tree structured dictionary data 200 differs from that in the corresponding data unit for the backward tree structured dictionary data 100.

The forward tree structured dictionary data 200 contains the same words as those corresponding to leaf nodes according to the tree structure of the backward tree structured dictionary data 100.

Figure 7:
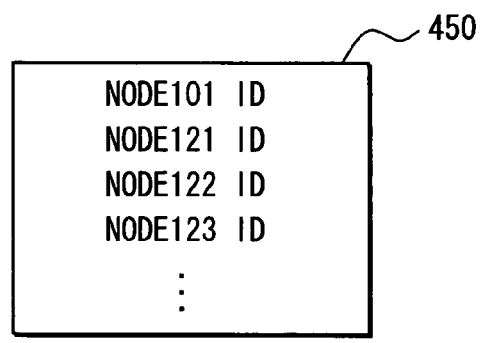
FIG. 7 shows the construction of backward specification data.
Figure 8:
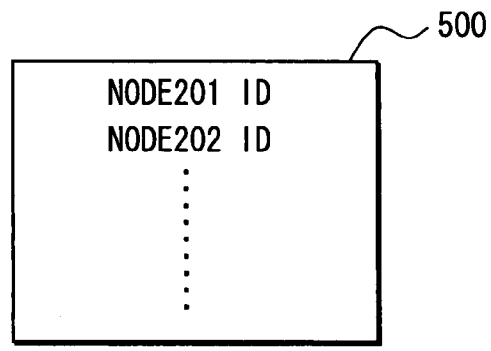
FIG. 8 shows the construction of forward specification data.

The recognition dictionary unit 77 stores backward specification data and forward specification data. The backward specification data is equivalent to an instance of separator specification data. The forward specification data is equivalent to an instance of leaf specification data. FIGS. 7 and 8 exemplify the constructions of backward specification data 450 and forward specification data 500.

As shown in FIG. 7, the backward specification data 450 contains node IDs for the root 101 and the separator nodes 121 through 123 in the backward tree structured dictionary data 100. The backward specification data 450 contains node IDs for the root and all the separator nodes except the one nearest to leaf nodes in the tree structure along paths from the root to the leaf nodes.

As shown in FIG. 8, the forward specification data 500 contains node IDs for the roots 201 and 202 in the forward tree structured dictionary data 200. The forward specification data 500 indirectly specifies the word nodes 211 through 216 subsequent to the roots 201 and 202.

The acoustic model unit 76 contains multiple acoustic models identified by specific model IDs. Each acoustic model is data that represents the feature quantity of a speech corresponding to one uttered word. For example, such data can be an LPC cepstrum for the speech or a hidden Markov model corresponding to the speech. The acoustic model unit 76 distinguishes between modes of reproducing a speech of one word in chronologically normal and reverse orders. There are provided two acoustic models for speech of a word. One is a forward acoustic model that represents the feature quantity of the speech reproduced in chronologically normal order. The other is a backward acoustic model that represents the feature quantity of the speech reproduced in chronologically backward order. The acoustic model unit 76 stores these acoustic models as different ones. The model ID for the forward acoustic model corresponding to a word node in the forward tree structured dictionary data 200 is provided with the same model ID as that in the data unit corresponding to the word node. The model ID for the backward acoustic model corresponding to a word node in the backward tree structured dictionary data 100 is provided with the same model ID as that in the data unit corresponding to the word node.

Figure 9:
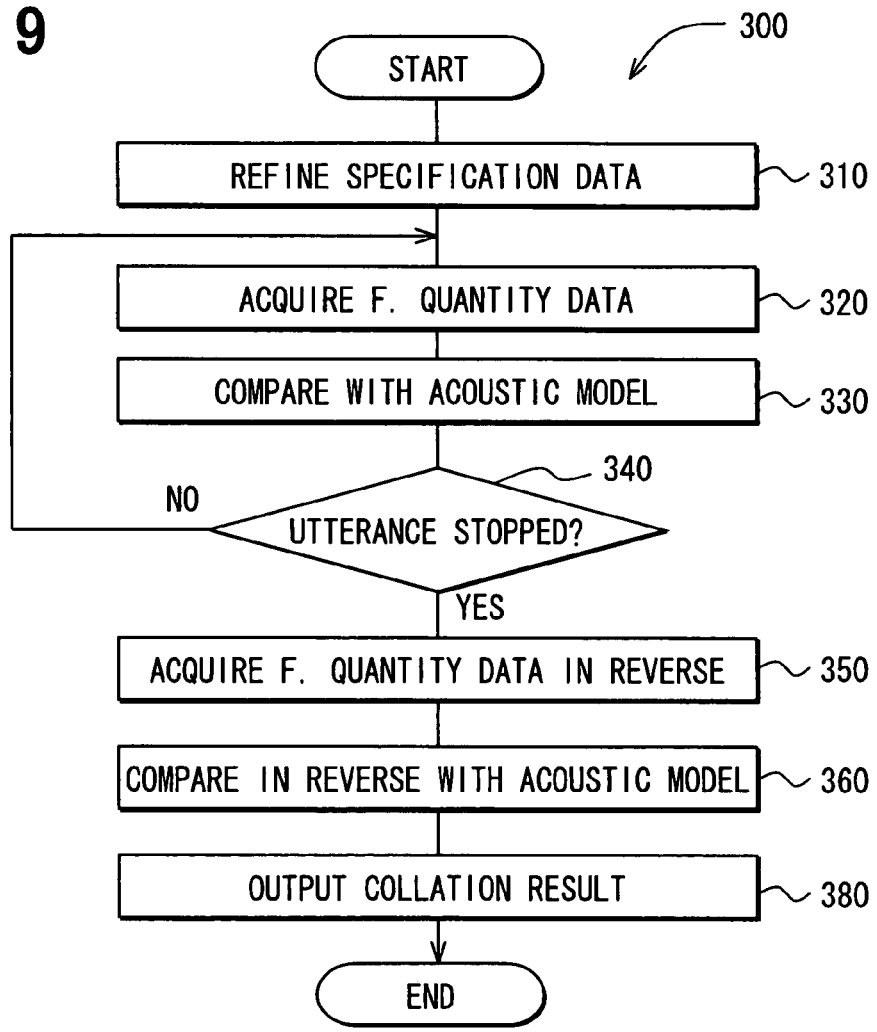
FIG. 9 is a flowchart of a program executed by a collation unit.

Using the above-mentioned dictionary data and specification data, the collation unit 75 repeatedly executes a program as shown in FIG. 9 so as to calculate a matching degree between each acoustic model and input feature quantity. The following describes operations of the speech recognition apparatus as a whole in response to a place name uttered by a user as well as operations the collation unit 75 implements by executing the program 300.

At Step S310, the collation unit 75 receives a signal for the intermediate place name information output from the intermediate information unit 74 or a signal indicating the absence of this information. The collation unit 75 repeats this step until starting receiving an input feature quantity from the speech input unit 11 based on a speech uttered by a user. Based on the received signal, the collation unit 75 refines one or more of all nodes in the backward specification data 450 and the forward specification data 500.

While refining the forward specification data 500, the collation unit 75 retrieves a word node corresponding to the place name indicated by the intermediate place name information in the most recently received signal from the backward tree structured dictionary data 100. The collation unit 75 extracts all nodes along the route from the retrieved word node to the root 101. The collation unit 75 selects a valid specification node, i.e., a node contained in both the backward specification data 450 and the extracted nodes.

When the intermediate place name information indicates AVENUE-A, BELLE-GRADE, and FLORIDA, for example, the node 155 is a word node corresponding to the intermediate place name information. Only the nodes 155, 142, 134, 122, 112, and 101 are extracted. In this case, the backward specification data 450 contains the root and the separator nodes that are not nearest to the leaf nodes. The collation unit 75 can select only the nodes 122 and 101 as valid specification nodes.

While refining the forward specification data 500, the collation unit 75 searches the forward tree structured dictionary data 200 for a word node corresponding to the place name indicated by the intermediate place name information in the most recently received signal. The word node is equivalent to the node 215 in the example above. The collation unit 75 selects the root, i.e., the parent node of the retrieved word node, as a valid specification node. The root is equivalent to the node 202 in the example above.

When the most recently received signal indicates the absence of intermediate place name information, the collation unit 75 selects only the node 101 as a specification node. All nodes in the backward specification data 450 and the forward specification data 500 may be selected as valid specification nodes.

Let us suppose that a user starts uttering an address name while pressing the talk switch 3. The input speech storage unit 62 and the speech analysis unit 64 in the speech input unit 11 realtime convert a signal for the speech uttered by the user into feature quantity data based on a unit segment of the speech. The feature quantity data is realtime output to the collation unit 75 chronologically parallel with the utterance.

When starting receiving the feature quantity data from the speech input unit 11, the collation unit 75 repeats Steps S320 and S330 until the user stops the utterance (see Step S340). In this manner, the collation unit 75 sequentially acquires the feature quantity data in chronological order (Step S320). The collation unit 75 compares the so-far acquired feature quantity data with an acoustic model in the recognition dictionary unit 77 (Step S330).

When an acoustic model is compared with the input feature quantity received from the speech input unit 11, the acoustic model is selected based on the valid specification node refined in the forward tree structured dictionary data 200 and the forward specification data 500. Specifically, the acoustic model to be compared with the input feature quantity chronologically reproduces a sequence of words starting from a valid specification node to a leaf node in the tree structure. An available comparison method uses, for example, DP matching, a neural network, or a hidden Markov model.

When the node 202 is a valid specification node in the above-mentioned example, the input feature quantity is compared with acoustic models for 10TH-ST, AVENUE-A, and WHITAKER-RD.

Terminating the utterance terminates the forward collation of forward speech by repetition of Steps S320 through S340. The collation unit 75 determines the matching degree between the acoustic model for comparison and the input feature quantity. The collation unit 75 may detect termination of the utterance based on a fact that the speech input unit 11 outputs no input feature quantity for a specified period. Alternatively, there may be a case where the speech period detection unit 61 in the speech input unit 11 outputs a signal indicating termination of an utterance period to the collation unit 75. The collation unit 75 may detect termination of the utterance based on reception of that signal.

When the user's utterance terminates, the input speech storage unit 62 in the speech input unit 11 immediately outputs the stored speech for the utterance period to the reverse reproduction unit 63. The reverse reproduction unit 63 reproduces the speech in chronologically backward order. The speech analysis unit 64 calculates a feature quantity for the reversely reproduced speech on a unit segment basis and outputs the feature quantity to the collation unit 75.

At Step S350, the collation unit 75 receives the feature quantity in chronologically backward order. At Step S360, the collation unit 75 compares the feature quantity in reverse reproduction order with an acoustic model in the recognition dictionary unit 77.

When an acoustic model is compared with the input feature quantity in reverse reproduction order received from the speech input unit 11, the acoustic model is selected based on the valid specification node refined in the backward tree structured dictionary data 100 and the backward specification data 450. Specifically, the acoustic model to be compared with the input feature quantity reproduces, in chronologically backward order, a word string starting with a leaf node and ending with a valid specification node toward the root in the tree structure. This acoustic model is hereafter referred to as a backward acoustic model. An available comparison method uses, for example, DP matching, a neural network, or a hidden Markov model.

When the nodes 122 and 101 are valid specification nodes in the above-mentioned example, the input feature quantity is compared with a backward acoustic model for a word string starting from the node 122 toward leaf nodes and with that for a word string starting from the node 101 toward leaf nodes. The word string starting from the node 101 contains beginning words corresponding to the nodes 111, 112, and 113 at the first hierarchy. The word string starting from the node 122 contains beginning words corresponding to the nodes 134 and 135 at the third hierarchy.

The input feature quantity in reverse reproduction order is sequentially compared with the backward acoustic model for each word string in the order toward leaf nodes in the tree structure of the backward tree structured dictionary data 100. For example, the beginning part of the input feature quantity in reverse reproduction order is compared with the backward acoustic model for ALABAMA to calculate matching degree A1. The next part of the input feature quantity in reverse reproduction order is compared with the backward acoustic models for ARLEY, ABANDA, and ALLENTON to calculate matching degrees B1, B2, and B3 based on comparison results and matching degree A1. The remaining part of the input feature quantity in reverse reproduction order is compared with the backward acoustic models for COUNTY-HWY-62, CR-41, and WHITE-RD to calculate matching degrees C1, C2, and C3 based on comparison results and matching degree B1. The matching degrees C1, C2, and C3 respectively correspond to those of speeches "COUNTY-HWY-62, ARLEY, Ala.," "CR-41, ARLEY, Ala.," and "WHITE-RD, ARLEY, Ala." uttered by the user.

At Step S360, the backward collation of backward speech compares the input feature quantity with multiple backward acoustic models starting with a leaf node and ending with a valid specification node toward the root in the tree structure. When Step S360 terminates, then Step S380 follows. At Step S380, the collation unit 75 outputs collation results to the result generation unit 78. The collation results include those from the forward collation of the forward speech at Steps S320 through S340 and those from the backward collation of the backward speech at Step S360. In addition, the collation unit 75 outputs a character string for the intermediate place name information to the result generation unit 78.

The result generation unit 78 receives the collation results such as the character data for multiple word strings and the matching degrees of the word strings from the collation unit 75. The result generation unit 78 then finds a word string having the highest matching degree greater than or equal to a specified value and replaces character data for that word string with part of the intermediate place name information. Let us use a term "most recent word string" to represent the word string having the highest matching degree greater than or equal to a specified value at a given time point. The above-mentioned replacement is equivalent to writing the most recent word string over a word string at the same hierarchy as the most recent word string in the intermediate place name information.

For example, let us suppose that the intermediate place name information is "AVENUE-A, BELLE-GRADE, FLORIDA" and that the word string having the highest matching degree greater than or equal to a specified value is "WHITAKER-RD." In this case, the above-mentioned overwriting generates word string "WHITAKER-RD, BELLE-GRADE, FLORIDA." The result generation unit 78 outputs character data of the generated word string to the process unit 17 and the result storage unit 73. The process unit 17 outputs the character data to the navigation apparatus 5 via the device control interface 16. The process unit 17 controls the speech output unit 13 so that the speaker 4 generates a sound corresponding to the character data. The result storage unit 73 stores the character data as recognition result data.

The above-mentioned overwriting may be performed only when a user performs a specified operation on the switch apparatus 7. Alternatively, it may be performed only when the result storage unit 73 already records the recognition result data.

In consideration for the above-mentioned operations, let us consider that the speech recognition apparatus provides "AVENUE-A, BELLE-GRADE, FLORIDA" as the intermediate place name information and the user utters "XXX, BEAN-CITY." In this case, XXX represents a word corresponding to a word node as a grandchild node of the node 135. The utterance "XXX, BEAN-CITY" ends with a word corresponding to the child node of the valid specification node 122. Backward acoustic models to be compared also include the backward acoustic model for "XXX, BEAN-CITY." Consequently, the collation unit 75 performs the backward collation of backward speech and identifies that backward acoustic model as the acoustic model having the highest matching degree greater than or equal to a specified value. The result generation unit 78 outputs the character string of "XXX, BEAN-CITY, FLORIDA" to the result storage unit 73 and the navigation apparatus 5.

As mentioned above, the speech recognition apparatus reversely reproduces an input speech to generate a backward speech. The speech recognition apparatus provides a backward acoustic model corresponding to a speech for reproducing, in chronologically backward order, a word string ending with a specified node in the tree structure. The speech recognition apparatus then compares the backward speech with the backward acoustic model. Since the backward tree structured dictionary data is used, the speech recognition apparatus can recognize a speech even when it is uttered up to the middle of a word string ranging from a leaf node to the root in the tree structure.

For example, let us consider that the speech recognition apparatus provides "AVENUE-A, BELLE-GRADE, FLORIDA" as the intermediate place name information and the user utters "CR-41, ARLEY." In this case, the word string "CR-41, ARLEY" does not end with a word corresponding to a child node of the valid specification node 122. It does not end with a word corresponding to a child node of the valid specification node 101. In addition, it does not correspond to a word node the valid specification node 202 indirectly specifies. Therefore, backward acoustic models to be compared contain neither backward acoustic model nor forward acoustic model for "CR-41, ARLEY." There is no acoustic model having the matching degree greater than or equal to a specified value.

Let us consider that the speech recognition apparatus provides "AVENUE-A, BELLE-GRADE, FLORIDA" as the intermediate place name information and the user utters "CR-41, ARLEY, Ala." In this case, the word string "CR-41, ARLEY, Ala." ends with a word corresponding to a child node of the valid specification node 101. Backward acoustic models to be compared contain a backward acoustic model for "CR-41, ARLEY, Ala." The collation unit 75 performs the backward collation of backward speech and identifies that backward acoustic model as the acoustic model having the highest matching degree greater than or equal to a specified value. The result generation unit 78 outputs the character string of "CR-41, ARLEY, Ala." to the result storage unit 73 and the navigation apparatus 5.

Let us consider that the speech recognition apparatus provides "AVENUE-A, BELLE-GRADE, FLORIDA" as the intermediate place name information and the user utters "WHITE-RD." In this case, the word string "WHITE-RD" does not end with a word corresponding to a child node of the valid specification node 122. It does not end with a word corresponding to a child node of the valid specification node 101. In addition, it does not correspond to a word node the valid specification node 202 indirectly specifies. Therefore, backward acoustic models to be compared contain neither backward acoustic model nor forward acoustic model for "WHITE-RD." There is no acoustic model having the matching degree greater than or equal to a specified value.

Let us consider that the speech recognition apparatus provides "AVENUE-A, BELLE-GRADE, FLORIDA" as the intermediate place name information and the user utters "10TH-ST." In this case, the word string "10TH-ST" corresponds to the word node 214 the valid specification node 202 indirectly specifies. Backward acoustic models to be compared contain a backward acoustic model for "10TH-ST." The collation unit 75 performs the forward collation of forward speech and identifies that forward acoustic model as the acoustic model having the highest matching degree greater than or equal to a specified value. The result generation unit 78 outputs the character string of "10TH-ST, BELLE-GRADE, FLORIDA" to the result storage unit 73 and the navigation apparatus 5.

The forward collation of forward speech compares the input feature quantity with a forward acoustic model that corresponds to a speech for chronologically forward reproducing a leaf node word in the tree structure. The forward acoustic model can most likely match the utterance of the leaf node word in the tree structure. Since the backward tree structured dictionary data is used, the speech recognition apparatus can recognize a speech even when it is uttered up to the middle of a word string ranging from a leaf node to the root in the tree structure.

The comparison is performed twice, backward and forward. This makes it possible to reduce more word strings to be compared at a time than the case of performing the backward comparison only. Reducing word strings can reduce the amount of necessary memory and accelerate the processing speed. A limited amount of available memory limits the number of words that can be compared at a time. Decreasing word strings to be compared at a time can yield a highly accurate result and improve the performance. The forward comparison is available during speech input. The number of words to be compared reversely affects the execution time. Performing the comparison twice, backward and forward, can accelerate the processing speed.

The collation unit 75 starts the forward collation of forward speech when it detects initiation of speech input but not termination thereof. After detecting termination of the speech input, the collation unit 75 starts the backward collation of backward speech. Part of the speech recognition can start before termination of the user's utterance. It is possible to complete the speech recognition in a short period of time.

Let us consider that the backward tree structured dictionary data 100 contains a state node "Michigan" followed by a grandchild hierarchy containing a state node "Detroit" further followed by a grandchild hierarchy containing street nodes "Central Street" and "Center Street." In this case, the forward tree structured dictionary data 200 contains "Central Street" and "Center Street" as child nodes of the same root.

Figure 10:
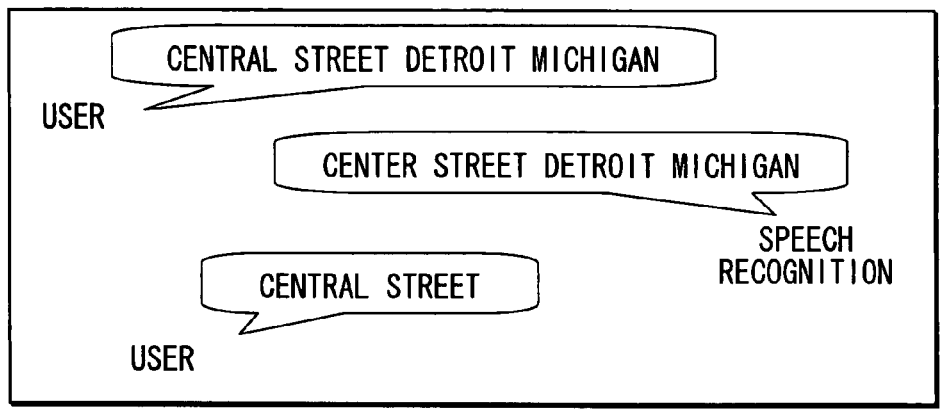
FIG. 10 shows how an incorrectly recognized place name is corrected.

According to an example in FIG. 10, the user utters "Central Street, Detroit, Mich." The collation unit 75 performs the backward collation of backward speech and the result generation unit 78 performs its process to incorrectly retrieve "Center Street, Detroit, Mich." as the most likely matching words. The speaker 4 generates a sound "Center Street, Detroit, Mich."

To correct the result, the user utters only "Central Street." The collation unit 75 performs the forward collation of forward speech and the result generation unit 78 performs its process to retrieve "Central Street" as the most likely matching words. The words "Central Street" replace "Center Street" in "Center Street, Detroit, Mich." as the most recently recognized intermediate place name information.

The speech recognition apparatus replaces part of the once output, highly likely matching word string with a most recent, highly likely matching leaf node word. The speech recognition apparatus may incorrectly recognize an uttered speech. The user may need to correct part of the speech he or she uttered. In such cases, the user can utter part of the speech to be corrected. The uttered leaf node word can replace part of the once output, highly likely matching word string. It is possible to efficiently recognize a word associated with a once highly likely matching word or word string.

As mentioned above, the speech recognition apparatus specifies an address name to which the current position belongs. The backward recognition of backward speech can use a leaf node that is a sibling node of the node corresponding to the word contained in the specified address name. In addition, the recognition can compare a backward acoustic model corresponding to the word string starting from the leaf node in the backward tree structured dictionary data 100 with the input feature quantity for a sequence to be reproduced in chronologically backward order. The forward recognition of forward speech can compare a forward acoustic model corresponding to the word equivalent to a sibling node of the node corresponding to the word contained in the specified address name with the input feature quantity for a chronological sequence. It is possible to efficiently recognize an address name associated with the location of the speech recognition apparatus.

Second Embodiment

Figure 11:
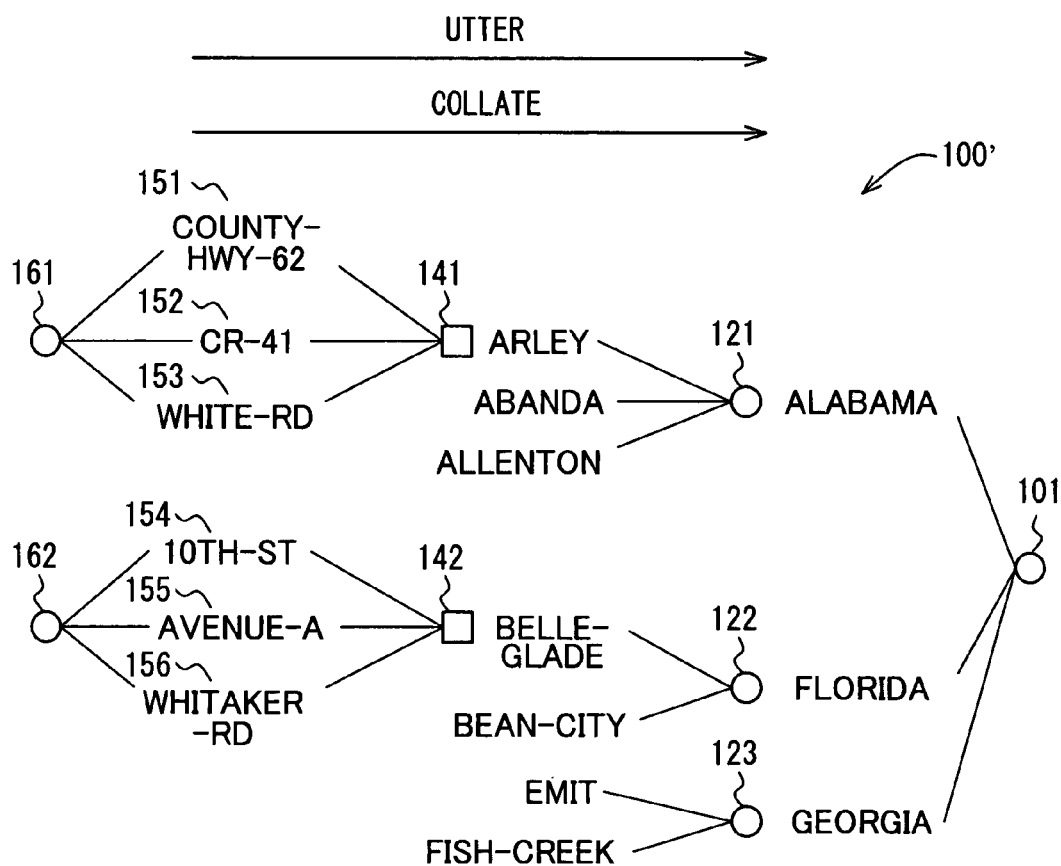
FIG. 11 shows the conceptual construction of backward tree structured dictionary data.

A second embodiment of the invention will be described mainly in terms of differences from the first embodiment. The speech recognition apparatus according to the second embodiment has the same hardware construction as the first embodiment. The recognition dictionary unit 77 according to the second embodiment uses backward tree structured dictionary data 100' as schematically shown in FIG. 11 instead of the backward tree structured dictionary data 100 according to the first embodiment. The recognition dictionary unit 77 according to the second embodiment includes no forward tree structured dictionary data.

As a difference from the first embodiment, the backward tree structured dictionary data 100' is provided with additional nodes 161 and 162 subsequent to the leaf nodes 151 through 156 in the tree structure. The additional nodes 161 and 162 belong to a higher hierarchy than the connected leaf nodes 151 through 156. The nodes 151, 152, and 153 are child nodes of the additional node 161. The 154, 155, and 156 are child nodes of the additional node 162. The additional node functions as an additional parent node of leaf node words in the tree structured dictionary data.

When part of the nodes 151 through 156 maintain the sibling relationship in terms of the parent-child relationship with the separator nodes 141 and 142 at the fourth hierarchy, the nodes also maintain the sibling relationship in terms of the parent-child relationship with the additional nodes 161 and 162. When part of the nodes 151 through 156 do not maintain the sibling relationship in terms of the parent-child relationship with the separator nodes 141 and 142 at the fourth hierarchy, the nodes do not either maintain the sibling relationship in terms of the parent-child relationship with the additional nodes 161 and 162.

The additional node is also formed to be the data unit 400 as shown in FIG. 5 similarly to each node in the backward tree structured dictionary data 100. The word and the model ID contain null values. The child node ID list records a node ID of the leaf node as a child node.

Figure 12:
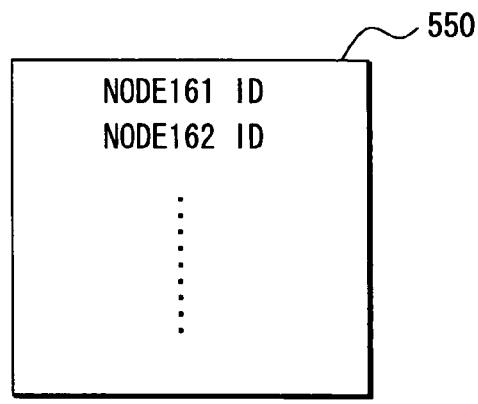
FIG. 12 shows the construction of leaf node specification data stored in a recognition dictionary unit according to a second embodiment.

The recognition dictionary unit 77 includes forward specification data 550 in FIG. 12 instead of the forward specification data 500 according to the first embodiment. The forward specification data 550 is equivalent to an example of leaf node dictionary data. The forward specification data 550 contains node IDs of all the additional nodes 161 and 162 in the backward tree structured dictionary data 100'. In this manner, the forward specification data 550 can be used to indirectly specify the leaf nodes 151 through 156.

The collation unit 75 performs the backward recognition of backward speech similarly to the first embodiment using the backward tree structured dictionary data 100' instead of the backward tree structured dictionary data 100.

The collation unit 75 performs the forward recognition of forward speech using the backward tree structured dictionary data 100' and forward specification data 550 instead of the forward tree structured dictionary data 200 and the forward specification data 500.

At Step S310 in FIG. 9, the collation unit 75 refines the forward specification data 550 and searches the backward tree structured dictionary data 100' for a word node corresponding to the place name indicated by the intermediate place name information in the most recently received signal. When the retrieved word node is associated with an additional node as a parent node, the collation unit 75 specifies the additional node as a valid specification node.

When Steps S320 through S340 are repeated, an acoustic model is compared with the input feature quantity received from the speech input unit 11. The collation unit 75 specifies that acoustic model based on the backward tree structured dictionary data 100' and the valid specification node refined from the forward specification data 550. Specifically, the acoustic model compared with the input feature quantity chronologically reproduces a sequence of words starting from the additional node 161 or 162 as the valid specification node to a parent node (also a separator node) closer to the root of the leaf nodes 151 through 156.

When the node 162 is a valid specification node in the example above, the input feature quantity is compared with the forward acoustic models for 10TH-ST, AVENUE-A, and WHITAKER-RD.

The backward tree structured dictionary data 100' associated with additional nodes is used for a leaf node of the backward tree structured dictionary data 100. The forward recognition of forward speech can be performed using part of the backward tree structured dictionary data 100' without using the forward tree structured dictionary data. It is possible to save the capacity of the storage medium (ROM or RAM) for the recognition dictionary unit 77.

Third Embodiment

A third embodiment of the invention will be described mainly in terms of differences from the first embodiment. The third embodiment differs from the first embodiment only in the use of a speech input unit 21 in FIG. 13 instead of the speech input unit 11.

Figure 13:
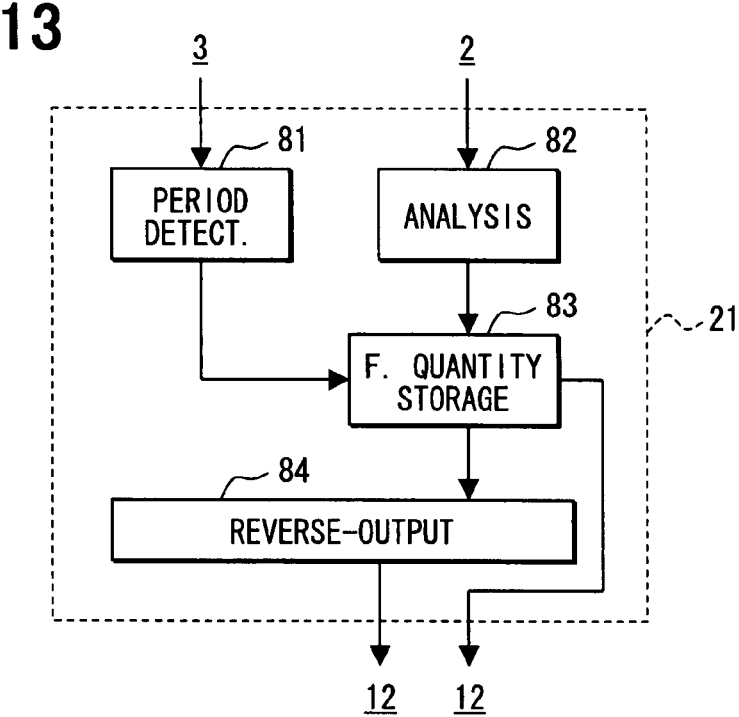
FIG. 13 shows the construction of a speech input unit according to a third embodiment.

As shown in FIG. 13, the speech input unit 21 includes a speech period detection unit 81, a speech analysis unit 82, a feature quantity storage unit 83, and a feature quantity reverse-output unit 84. Each of the units 81 through 84 is composed of a microcomputer including a set of a CPU, ROM, RAM, and the like. The CPU reads a program for implementing functions (to be described) from the corresponding ROM and executes the program. When executing the program, the CPU reads or writes data to the corresponding RAM.

The speech period detection unit 81 detects the beginning of user's utterance period based on a user's press of the talk switch 3. The speech period detection unit 81 detects the end of user's utterance period based on a user's release of the talk switch 3. Immediately after detecting the beginning of utterance period, the speech period detection unit 81 accordingly outputs a signal to the feature quantity storage unit 83. Immediately after detecting the end of utterance period, the speech period detection unit 81 accordingly outputs a signal to the feature quantity storage unit 83.

The speech analysis unit 82 receives a speech signal from the microphone 2. Upon reception, the speech analysis unit 82 immediately determines feature quantity (e.g., LPC cepstrum) at an interval of the received speech signal's unit segment during this period. The speech analysis unit 82 immediately outputs the feature quantity to the feature quantity storage unit 83.

The feature quantity storage unit 83 receives a feature quantity from the speech analysis unit 82 during the utterance period and stores the received feature quantity as chronological data according to the sequence of unit segments. The utterance period ranges between the reception of a signal indicating the beginning of the utterance period from the speech period detection unit 81 and the reception of a signal indicating the end thereof from the same. The feature quantity storage unit 83 receives a feature quantity from the speech analysis unit 82 at an interval of the unit segment during the utterance period. The feature quantity storage unit 83 immediately outputs the received feature quantity to the speech recognition unit 12 in the order of reception. The feature quantity storage unit 83 receives the signal indicating the end of the utterance period from the speech period detection unit 81, and then outputs the feature quantity data stored during the utterance period to the feature quantity reverse-output unit 84 at a time.

The feature quantity reverse-output unit 84 receives the feature quantity data from the feature quantity storage unit 83. The feature quantity reverse-output unit 84 sorts the received feature quantity data in the reverse order of the unit segment sequence. The feature quantity reverse-output unit 84 outputs the sorted feature quantity data to the speech recognition unit 12.

According to the above-mentioned construction, the speech input unit 21 specifies a period for continuously pressing the talk switch 3 as the utterance period. When the user utters a speech during the specified utterance period, the speech input unit 21 chronologically and realtime outputs the feature quantity of that speech to the speech recognition unit 12. The user speech is stored during the utterance period. After the end of the utterance period, the speech input unit 21 outputs the feature quantity of the stored user speech to the speech recognition unit 12 in chronologically backward order. The reversely reproduced feature quantity to be output is equivalent to an example of the backward speech.

Fourth Embodiment

A fourth embodiment of the invention will be described mainly in terms of differences from the first embodiment. The speech recognition apparatus according to the fourth embodiment has the same hardware construction as the first embodiment. The recognition dictionary unit 77 according to the fourth embodiment includes backward specification data 600 in FIG. 14 instead of the backward specification data 450 according to the first embodiment. The recognition dictionary unit 77 according to the fourth embodiment includes neither the forward tree structured dictionary data 200 nor the forward specification data 500.

Figure 14:
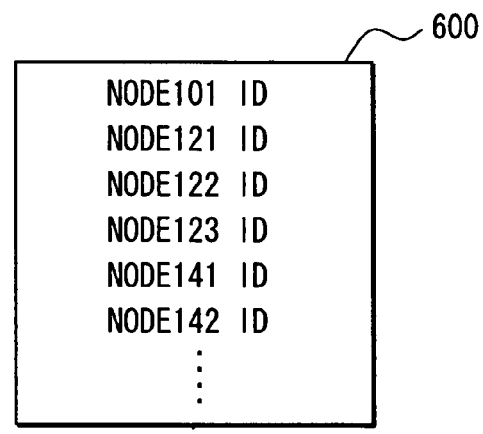
FIG. 14 shows the construction of backward tree structured dictionary data according to a fourth embodiment.

The backward specification data 600 in FIG. 14 differs from the backward specification data 450 according to the first embodiment as follows. The backward specification data 450 does not specify the nodes 141 and 142 of the backward tree structured dictionary data 100, but the backward specification data 600 does.

Figure 15:
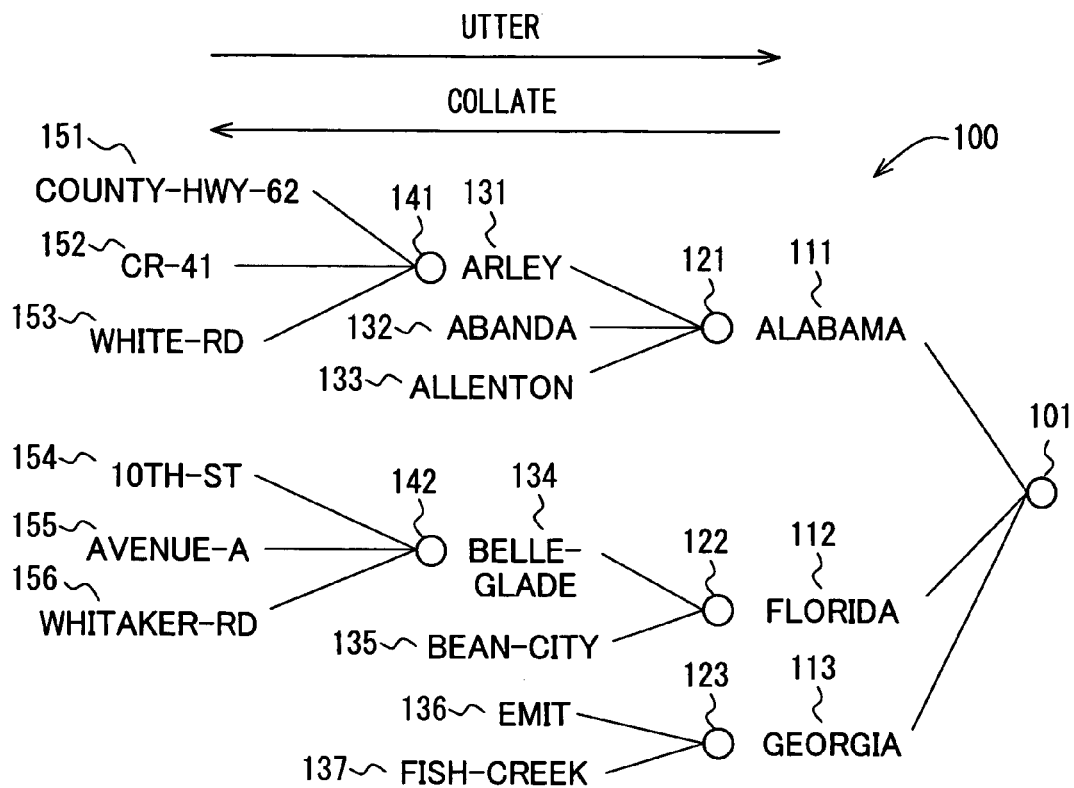
FIG. 15 shows the conceptual construction of backward tree structured dictionary data according to a fourth embodiment.

Accordingly, the first and fourth embodiments use the same structure of the backward tree structured dictionary data 100 included in the recognition dictionary unit 77. Conceptually, however, there is a difference between the embodiments in that the nodes 141 and 142 of the backward tree structured dictionary data 100 function as specification nodes according to the fourth embodiment as shown in FIG. 15.

The collation unit 75 according to the fourth embodiment does not perform the forward recognition of forward speech. The collation unit 75 performs the backward recognition of backward speech using the backward tree structured dictionary data 100 and the backward specification data 600.

Let us suppose that the user utters "10TH-ST" when the speech recognition apparatus according to the above-mentioned construction indicates AVENUE-A, BELLE-GRADE, and FLORIDA as the intermediate place name information.

The character string "10TH-ST" ends with the word equivalent to a child node of the valid specification node 142. Backward acoustic models to be compared also include the backward acoustic model for "10TH-ST". The collation unit 75 performs the backward collation of backward speech and identifies that backward acoustic model as the acoustic model having the highest matching degree greater than or equal to a specified value. The result generation unit 78 outputs the character string "10TH-ST, BELLE-GRADE, FLORIDA" to the result storage unit 73 and the navigation apparatus 5.

In this manner, the parent node of leaf word nodes may be used as a specification node when the collation unit 75 performs the backward recognition of backward speech without performing the forward recognition of forward speech.

In the above-mentioned embodiments, the ROM and the RAM for each microcomputer in the control apparatus 1 are equivalent to an example of storage media. The forward tree structured dictionary data 200 is equivalent to an example of the leaf node dictionary data. The backward tree structured dictionary data 100 is equivalent to an example of tree structured dictionary data. The navigation apparatus 5 is equivalent to an example of a place name specification means or unit. The speech period detection unit 61 is equivalent to an example of a detection means or unit. The result generation unit 78 is equivalent to an example of an output means or unit. The collation unit 75 functions as an example of a backward speech comparison means or unit by performing Steps S350 and S360 of the program 300. It functions as an example of a forward speech comparison means or unit by performing Steps S320, S330, and S340. It functions as an example of a selection means or unit by performing Step S310.

Other Embodiments

While there have been described the embodiments of the invention, the scope of the invention is not limited thereto but may include changes and modifications capable of embodying the specifications in the invention.

According to the above-mentioned embodiments, for example, one word node represents one word in the backward tree structured dictionary data 100 and 100' and the forward tree structured dictionary data 200. Further, the other modifications may be available. In each tree structured dictionary data, one word node may represent one phoneme (a, o, u, or the like) or one syllable.

Figure 16:
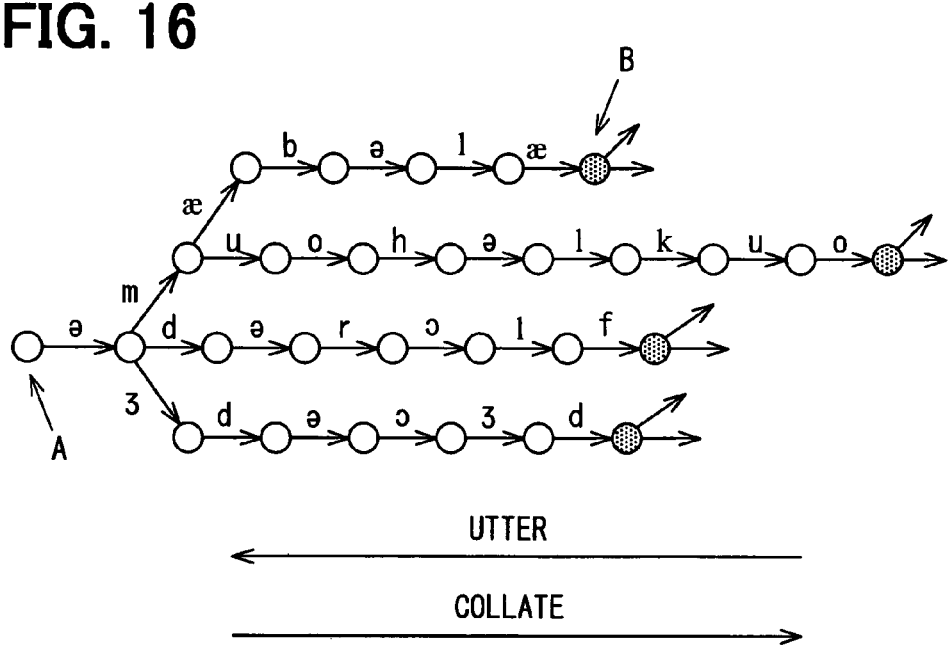
FIG. 16 shows an example of the backward tree structured dictionary data when a node is constructed on a phoneme basis.

When one phoneme constitutes a word node, the backward tree structured dictionary data contains phonemes and words that are separated in the order of utterance from leaf nodes to the root. In this case, the forward tree structured dictionary data contains phonemes and words that are separated in the order of utterance from the root to leaf nodes. FIG. 16 shows an example of the backward tree structured dictionary data containing phoneme-based word nodes. It should be noted that the direction from the root to leaf nodes in FIG. 16 differs from that of the other backward tree structured dictionary data 100 and 100'.

The backward tree structured dictionary data in FIG. 16 exemplifies some state names in the United States. Each state name is phonetically represented and is divided into phonemes that are then arranged from the left to the right (i.e., from the root to leaf nodes) in the order of utterance. In FIG. 16, open circle mark ○ is equivalent to a word node representing a phoneme. Filled circle Mark ● is equivalent to a separator node.

A path from the root indicated by arrow A to the separator node indicated by arrow B reversely represents the State of Alabama in units of phonemes. "Alabama" is equivalent to a word to be recognized. The word is further followed by city names in the State of Alabama. Each city name is reversely represented in units of phonemes. The four state names, Alabama, Oklahoma, Florida, and Georgia, have the same last phoneme and therefore diverge from the same separator node. Similarly, city names in the same state diverge from the same separator node. Street names in the same city diverge from the same separator node.

When the phoneme-based backward or forward tree structured dictionary data is used, the collation unit 75 compares a backward speech with a backward acoustic model. The backward speech is generated by reproducing an input speech in chronologically backward order. The backward acoustic model corresponds to a speech resulting from reproducing a sequence of a word string (or phoneme string in this case) toward the root of the tree structure in chronologically backward order. The comparison is performed in the reverse order of the sequence, i.e., from the root to leaf nodes. Further, the collation unit 75 compares the input speech with a forward acoustic model. The forward acoustic model corresponds to a speech resulting from chronologically reproducing a sequence of words (i.e., a word string composed of multiple phonemes). The sequence starts from a node for a leaf node word (a phoneme in this case) toward the root and ends with a node other than the root of the tree structure. The comparison is performed in the order of the sequence. Based on these comparison results, the result generation unit 78 outputs a word string that highly likely matches the input speech.

When the phoneme-based or syllable-based backward or forward tree structured dictionary data is used, the acoustic model unit 76 may provide an acoustic model for each phoneme or syllable in chronologically forward and backward orders of reproduction.

A node indicating separation of a word is not limited to the nodes 121 through 123, 141, and 142 for separating words from each other. When tree structured dictionary data uses each node to indicate one word, a word separator may correspond to a node itself for the word. When tree structured dictionary data uses each node to indicate one phoneme, a word separator may correspond to a node for a first or last phoneme of the word.

The speech recognition apparatus may recognize a speech command. For example, the recognition dictionary unit 77 may include a speech command recognition dictionary. The acoustic model unit 76 may include an acoustic model for reversely reproducing a speech command. In this case, the collation unit 75 can output a command as a highly likely matching word to the navigation apparatus 5 in the same manner as the backward recognition of backward speech. The navigation apparatus 5 can implement an operation based on the command.

When the speech recognition apparatus can recognize a speech command, the result generation unit 78 may perform the replacement for input speech correction only in response to a user-uttered command for the replacement.

The acoustic model unit 76 may contain acoustic models all of which only correspond to the forward or backward order of reading. The feature quantity and the acoustic model are reproduced in chronologically backward or forward order and are compared as follows. Feature quantities are sequenced in chronologically backward order corresponding to the unit segment for each acoustic model. The reversely sequenced feature quantities are compared with an input speech.

The forward specification data 500 and 550 may be constructed to directly specify a node ID of each leaf node instead of indirectly specifying it via the root of the forward tree structured dictionary data 200 or the additional node in the backward tree structured dictionary data 100'.

The tree structure may be formed from leaf nodes to the root not only in the order of street, city, and state according to the above-mentioned embodiments, but also in the order of house number, street, city, and state.

The collation unit 75 may create the forward tree structured dictionary data 200 from the backward tree structured dictionary data 100 based on the intermediate place name information each time a forward speech is recognized forward. This eliminates the need for previously providing the recognition dictionary unit 77 with the forward tree structured dictionary data 200.

The leaf node dictionary data need not have the forward tree structure according to the above-mentioned embodiments or even the tree structure. The leaf node dictionary data only needs to contain the same word string as an intermediate word string.

The speech period detection units 61 and 81 of the speech input units 11 and 21 may receive a signal not only from the talk switch 3, but also from the microphone 2. Pressing the talk switch 3 may detect the beginning of a period of user utterance. The end of the utterance period may be detected according to a specified period of continuous silence indicated by a signal from the microphone 2. The utterance period may be detected while the microphone 2 supplies a signal having a specified amplitude or more.

The speech input unit 11, the speech recognition unit 12, and the process unit 17 may contain special circuits corresponding to the respective functions. A single microcomputer may be used to implement the functions of the speech input unit 11, the speech recognition unit 12, and the process unit 17 in the control apparatus 1.

The speech recognition apparatus according to the invention is not necessarily mounted on a vehicle and may be used under any circumstances.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A speech recognition apparatus comprising:
a storage medium for storing tree structured dictionary data that contains a plurality of words as nodes in a tree structure;
a backward speech comparison unit for comparing a backward speech resulting from reproducing an input speech in chronologically backward order with a backward acoustic model corresponding to a speech of reversely reproducing a word string sequence toward a root of the tree structure, wherein a comparison is performed in reverse order of the sequence;
a forward speech comparison unit for comparing the input speech with a forward acoustic model corresponding to a speech resulting from reproducing a leaf node word of the tree structure in chronologically forward order;
a detection unit for detecting a beginning and an end of receiving the input speech, wherein the forward speech comparison unit starts comparing received part of the input speech with the forward acoustic model immediately when the detection unit detects a beginning of receiving the input speech before detecting an end of receiving the input speech; and
an output unit for outputting a word or a word string highly likely matching the input speech based on a comparison result each from the backward speech comparison unit and the forward speech comparison unit.

2. The speech recognition apparatus of claim 1,
wherein the storage medium stores leaf node dictionary data containing a word same as a leaf node word according to the tree structure in the tree structured dictionary data; and
wherein the forward speech comparison unit compares the input speech with a forward acoustic model corresponding to a speech resulting from chronologically reproducing the word recorded in the leaf node dictionary data.

3. The speech recognition apparatus of claim 1,
wherein the storage medium stores leaf specification data for specifying a leaf node word according to the tree structure in the tree structured dictionary data; and
wherein the forward speech comparison unit compares the input speech with a forward acoustic model corresponding to a speech resulting from chronologically reproducing the word specified by the leaf specification data.

4. The speech recognition apparatus of claim 1, comprising:
a selection unit for selecting a plurality of words from a group of leaf node words according to the tree structure,
wherein the forward speech comparison unit compares the input speech with a forward acoustic model corresponding to a speech resulting from chronologically reproducing the plurality of words selected by the selection unit.

5. The speech recognition apparatus of claim 4, comprising:
a place name specification unit for specifying an address name corresponding to a current position of the speech recognition apparatus,
wherein the tree structured dictionary data contains a sequence of words from a root to a leaf node of a tree structure, and each word represents one address name, and
wherein the selection unit selects a word from a group of the leaf node words based on the address name specified by the place name specification unit.

6. The speech recognition apparatus of claim 4,
wherein the selection unit selects a word from a group of the leaf node words based on a word or a word string previously output by the output unit.

7. The speech recognition apparatus of claim 6,
wherein the output unit replaces part of a highly likely matching word string previously output by the output unit with a most recent, highly likely matching leaf node word and outputs a word string as a replacement result.

8. A speech recognition apparatus comprising:
a storage medium for storing tree structured dictionary data that contains a plurality of words as nodes in a tree structure;
a backward speech comparison unit for comparing a backward speech resulting from reproducing an input speech in chronologically backward order with a backward acoustic model corresponding to a speech of reproducing, in chronologically backward order, a word string sequence toward a root of the tree structure, wherein a comparison is performed in reverse order of the sequence;

a forward speech comparison unit for comparing the input speech with a forward acoustic model corresponding to a speech resulting from chronologically reproducing an intermediate word string, which is a sequence of a word string starting from a leaf node word toward a root and ending with a node other than the root of the tree structure, wherein a comparison is performed in order of the sequence;

a detection unit for detecting a beginning and an end of receiving the input speech, wherein the forward speech comparison unit starts comparing a received part of the input speech with the forward acoustic model immediately when the detection unit detects a beginning of receiving the input speech before detecting an end of receiving the input speech; and an output unit for outputting a word string highly likely matching the input speech based on a comparison result each from the backward speech comparison unit and the forward speech comparison unit.

9. The speech recognition apparatus of claim 8, wherein the storage medium stores leaf node dictionary data containing a word string same as the intermediate word string; and wherein the forward speech comparison unit compares the input speech with a forward acoustic model corresponding to a speech resulting from chronologically reproducing the word string recorded in the leaf node dictionary data in order of a sequence of the word string.

10. The speech recognition apparatus of claim 8, wherein the storage medium stores leaf specification data for specifying the intermediate word string in the tree structured dictionary data; and wherein the forward speech comparison unit compares the input speech with a forward acoustic model corresponding to a speech resulting from chronologically reproducing the intermediate word string specified by the leaf specification data in order of the sequence of the intermediate word string.

11. The speech recognition apparatus of claim 8, comprising:

a selection unit for selecting the word string from a sequence of word strings that starts from a leaf node word toward a root and ends with a node other than the root of the tree structure, wherein the forward speech comparison unit compares, in order of the sequence, the input speech with a forward acoustic model corresponding to a speech resulting from chronologically reproducing the intermediate word string selected by the selection unit.

12. The speech recognition apparatus of claim 11, comprising:

a place name specification unit for specifying an address name corresponding to a current position of the speech recognition apparatus, wherein the tree structured dictionary data contains a sequence of words from a root to a leaf node of a tree structure, and each word represents one address name, and wherein the selection unit selects the intermediate word string based on the address name specified by the place name specification unit.

13. The speech recognition apparatus of claim 11, wherein the selection unit selects the intermediate word string based on a highly likely matching word string previously output by the output unit.

14. The speech recognition apparatus of claim 13, wherein the output unit replaces part of a highly likely matching word string previously output by the output unit with a most recent, highly likely matching intermediate word string and outputs a word string as a replacement result.

15. A speech recognition apparatus comprising:

a storage medium for storing tree structured dictionary data and separator specification data, wherein the tree structured dictionary data contains a plurality of words as nodes in a tree structure and the separator specification data specifies a plurality of nodes equivalent to separators for words of the tree structured dictionary data other than a root in the tree structure;

a backward speech comparison unit for comparing a backward speech resulting from reproducing an input speech in chronologically backward order with a backward acoustic model corresponding to a speech of reproducing, in chronologically backward order, a sequence of words or word string that is arranged toward a root of the tree structure and ends with one of the plurality of nodes specified by the separator specification data, wherein a comparison is performed in reverse order of the sequence; and an output unit for outputting a word or a word string highly likely matching the input speech based on a comparison result from the backward speech comparison unit.

16. The speech recognition apparatus of claim 15, comprising:

a selection unit for selecting part of a plurality of nodes specified by the plurality of pieces of separator specification data, wherein the backward speech comparison unit compares the backward speech with a backward acoustic model corresponding to a speech resulting from reproducing, in chronologically backward order, a sequence of words or word string ending with the selected node; and wherein a comparison is performed in reverse order of the sequence.

17. The speech recognition apparatus of claim 15, comprising:

a forward speech comparison unit for comparing the input speech with a forward acoustic model corresponding to a speech resulting from chronologically reproducing a sequence of words that starts from a leaf node word toward a root and ends with a node other than the root of the tree structure, wherein a comparison is performed in order of the sequence, wherein the node specified by the separator specification data corresponds to a node other than a separator for a word nearest to a leaf node of the tree structure in the tree structured dictionary data; and wherein the output unit outputs a word string highly likely matching the input speech based on a comparison result each from the backward speech comparison unit and the forward speech comparison unit.

18. The speech recognition apparatus of claim 15, comprising:

a forward speech comparison unit for comparing the input speech with a forward acoustic model corresponding to a speech resulting from reproducing a leaf node word of the tree structure in chronologically forward order, wherein the node specified by the separator specification data corresponds to a node other than a separator for a word nearest to a leaf node of the tree structure in the tree structured dictionary data; and wherein the output unit outputs a word or a word string highly likely matching the input speech based on a comparison result each from the backward speech comparison unit and the forward speech comparison unit.

19. A computer program product in a computer-readable medium for use in recognizing a speech, the product comprising:

instructions for performing backward speech comparison to compare a backward speech resulting from reproducing an input speech in chronologically backward order with a backward acoustic model corresponding to a speech of reversely reproducing a word string sequence toward a root of a tree structure for tree structured dictionary data containing a plurality of words as nodes in the tree structure, wherein the comparison is made in reverse order of the sequence;

instructions for performing forward speech comparison to compare the input speech with a forward acoustic model corresponding to a speech resulting from reproducing a leaf node word of the tree structure in chronologically forward order, wherein comparing of a received part of the input speech with the forward acoustic model is started immediately when a beginning of receiving the input speech is detected, before an end of receiving the input speech is detected; and instructions for outputting a word or a word string highly likely matching the input speech based on a comparison result each from the backward speech comparison and the forward speech comparison.

20. A computer program product in a computer-readable medium for use in recognizing a speech, the product comprising:

instructions for performing backward speech comparison to compare a backward speech resulting from reproducing an input speech in chronologically backward order with a backward acoustic model corresponding to a speech of reproducing, in chronologically backward order, a word string sequence toward a root of a tree structure for tree structured dictionary data containing a plurality of words as nodes in the tree structure, wherein the comparison is performed in reverse order of the sequence;

instructions for performing forward speech to compare the input speech with a forward acoustic model corresponding to a speech resulting from chronologically reproducing an intermediate word string, which is a sequence of a word string starting from a leaf node word toward a root and ending with a node other than the root of the tree structure, wherein the comparison is performed in order of the sequence, wherein comparing of a received part of the input speech with the forward acoustic model is started immediately when a beginning of receiving the input speech is detected, before an end of receiving the input speech is detected; and instructions for outputting a word string highly likely matching the input speech based on a comparison result each from the backward speech comparison and the forward speech comparison.

21. A computer program product in a computer-readable medium for use in recognizing a speech, the product comprising:

instructions for reading tree structured dictionary data and separator specification data from a storage medium for storing the data, wherein the tree structured dictionary data contains a plurality of words as nodes in a tree structure and the separator specification data specifies a plurality of nodes equivalent to separators for words of the tree structured dictionary data other than a root in the tree structure;

instructions for performing backward speech comparison to compare a backward speech resulting from reproducing an input speech in chronologically backward order with a backward acoustic model corresponding to a speech of reproducing, in chronologically backward order, a sequence of words or word string that is arranged toward a root of the tree structure and ends with one of the plurality of nodes specified by the separator specification data, wherein the comparison is performed in reverse order of the sequence; and instructions for outputting a word or a word string highly likely matching the input speech based on a comparison result from the backward speech comparison.

* * * * *